3,010,956
11α-HALO-11β-METHYL-Δ⁴-PREGNENES AND PROCESS THEREFOR
Gordon H. Thomas, Birmingham, England, and Josef Fried, Princeton, N.J., assignors to Olin Mathieson Chemical Corporation, New York, N.Y., a corporation of Virginia
No Drawing. Filed May 23, 1958, Ser. No. 737,217
7 Claims. (Cl. 260—239.55)

This invention relates to the synthesis of steroids and has for its objects the provision of new steroids of the general Formulae I and II:

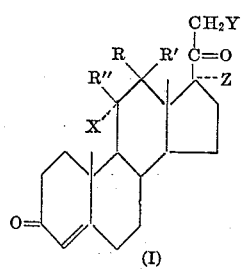

and

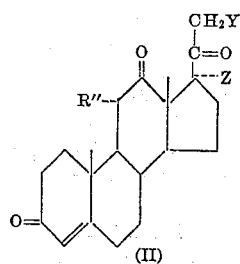

wherein R is hydrogen, R' is β-hydroxy or together R and R' is keto, R" is lower alkyl (preferably methyl), X is halogen, Y is hydrogen, hydroxy, or acyloxy, and Z is hydrogen or hydroxy; a process for preparing these new steroids; and new intermediates useful in said preparation.

The new steroids of this invention are prepared by a series of steps which comprises: (a) interacting a steroid of the general Formula III:

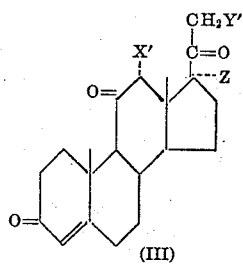

wherein Z is as hereinbefore defined, Y' is hydrogen or hydroxy, and X' is chloro or, preferably, fluoro, with a glycol of the formula A(OH)₂ to yield as new intermediates of this invention steroids of the general Formula IV:

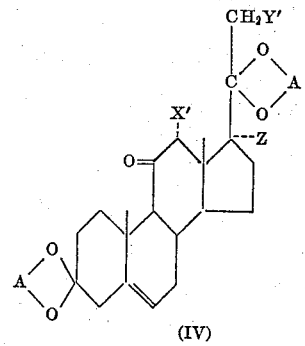

wherein X', Y' and Z are as hereinbefore defined and A a divalent organic radical, such as lower alkylene (e.g., ethylene, propylene-1,2 and propylene-1,3). The reaction is preferably carried out with an excess of glycol at an elevated temperature in the presence of a strong acid catalyst (e.g., p-toluenesulfonic acid). Among the suitable starting steroid reactants may be mentioned 12α-fluoro-11-ketoprogesterone, 12α-chloro-11-ketoprogesterone, 12α-fluoro-17α-hydroxy-11-ketoprogesterone, 12α-fluoro-Δ⁴-pregnene-21-ol-3,11,20-trione and 12α-fluorocortisone. [These starting steroid reactants can be prepared by the processes described in Belgian Patent No. 549,150 and South African Patent No. 2,041/1956.]

The 3,20-diketal formed is then reacted with lithium lower alkyl (e.g., lithium methyl) to yield the corresponding 11α-(lower alkyl)-11β,12β-epoxy derivatives which are new steroids of the general Formula V:

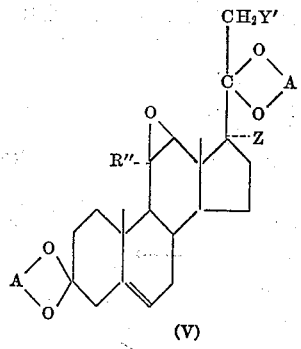

wherein A, R", Y' and Z are as hereinbefore defined. The reaction is preferably carried out in an organic solvent for the steroid, such as benzene, at any normal temperature, such as ambient temperature.

The epoxide intermediates are then treated with a hydrogen halide and the 3,20-diketal groups are hydrolyzed in situ to yield certain of the final products of this invention. If hydrogen fluoride is used a mixture of products is formed, one of which being of the Formula I, wherein X is fluoro, R is hydrogen and R' is β-hydroxy; and the other being of the Formula II. If, however, any other hydrogen halide is employed (i.e., hydrogen chloride, hydrogen bromide and hydrogen iodide), then, after hydrolysis, only compounds of Formula I are obtained, the value of X corresponding to the halide chosen and R being hydrogen and R' being β-hydroxy.

To prepare compounds of formula I wherein R and

R' is keto, the 11β-hydroxy compounds are oxidized in the usual manner as by treatment with a hexavalent chromium compound (e.g., chromium trioxide). If a steroid containing a free 21-hydroxy group is employed as the reactant, the 21-hydroxy group must be protected as by esterifying in the usual manner with an acid anhydride or acyl halide. The preferred acylating agents are the acid anhydrides or acyl chlorides of hydrocarbon carboxylic acids of less than ten carbon atoms as exemplified by the lower alkanoic acids (e.g. acetic, propionic and butyric acid), monocyclic aryl carboxylic acids (e.g. benoic and toluic acid), monocyclic aryl lower alkanoic acids (e.g. phenacetic and β-phenyl propionic acid), lower alkenoic acids, cycloalkane-carboxylic acids, and cycloalkene-carboxylic acids.

If the 21-hydroxy group is not protected, the 17-side chain is oxidized off yielding a 11α-halo-11β-(lower alkyl)-12-ketoandrostenedione, which are new compounds possessing adrogenic activity and hence utilizable in lieu of testosterone in the treatment of male and female climacteric, etc.

The final products of this invention (steroids of the Formula I or II) are physiologically active substances. Thus, those steroids which possess a 17α-hydroxy group have gluco-corticoid activity and hence can be used in lieu of known glucocorticoid steroids such as hydrocortisone in the treatment of rheumatoid arthritis. Those steroids which possess a 21-hydroxy group (and are unsubstituted in the 17α-position) possess mineralocorticoid activity and hence can be used in lieu of known mineralocorticoids such as desoxycorticosterone in the treatment of Addison's disease. Those steroids which are unsubstituted in both the 17α and 21 positions possess progestational activity and hence may be used in lieu of known progestational steroids, such as progesterone, in the treatment of habitual abortion. In each instance the new steroids of this invention can be formulated for administration in the same type of preparations as are used for known steroids having the same general utility, with concentration and/or dosage based on the activity of the particular compound.

The process of this invention can be illustrated by the following scheme employing 12α-fluoro-11-ketoprogesterone as a representative starting material:

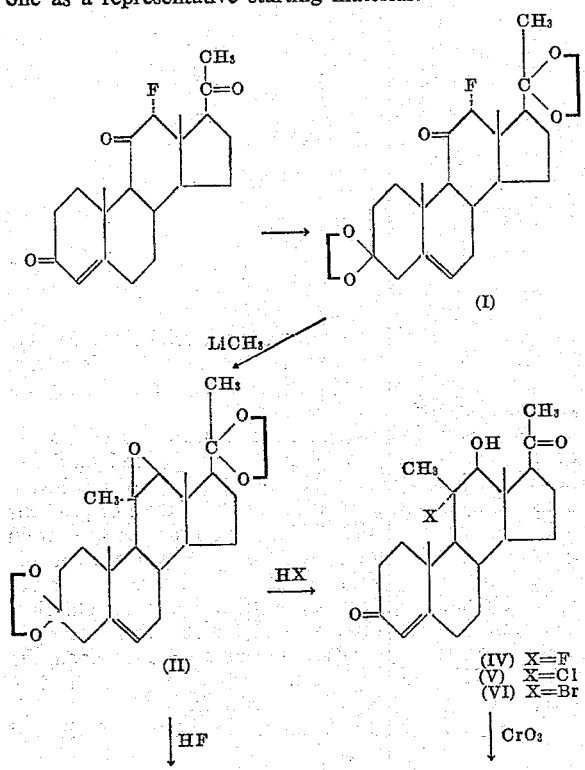

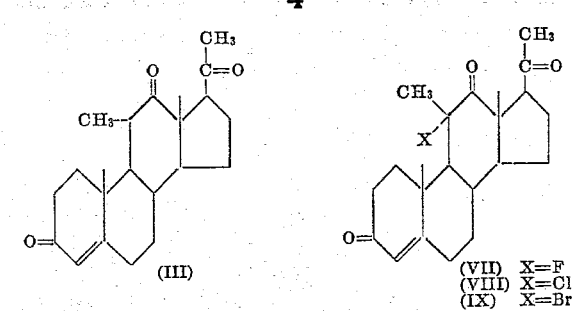

The following examples illustrate the invention (all temperature being in centigrade):

EXAMPLE 1

*12α-fluoro-11-ketoprogesterone 3,20-bis-ethylene ketal (I)*

A mixture of 12α-fluoro-11-ketoprogesterone (250 mg.) and 8.5 mg. of p-toluenesulfonic acid monohydrate, in 4 ml. of ethylene glycol and 20 ml. of benzene is heated under reflux for 24 hours, the water formed during the reaction being removed azeotropically in a suitable separator. More benzene (30 ml.) is added and the solution is washed successively with dilute sodium bicarbonate solution and water, dried over sodium sulfate and the solvent evaporated in vacuo. Crystallization of the residue from acetone-hexane gives about 116 mg. of the bisketal, M.P. about 149–152°; $[\alpha]_D +32°$ (c. 1.16 in $CHCl_3$);

$$\lambda^{Nujol}_{max.} 5.80\mu$$

*Analysis.*—Calcd. for $C_{25}H_{35}O_5F$ (434.53): C, 69.1; H, 8.12; F, 4.37. Found: C, 69.33; H, 8.20; F, 4.69.

Similarly, by substituting other glycols, such as 1,2-propylene glycol or 1,3-propylene glycol, for the ethylene glycol in Example 1, the corresponding 3,20-diketals (e.g. the 3,20-bis-1,2-propylene ketal and 3,20-bis-propylene ketal) are formed. Furthermore, by substituting other steroids, such as 12α-chloro-11-ketoprogesterone, 12α-fluoro-17α-hydroxy-11-ketoprogesterone, 12α-fluoro-Δ⁴-pregnene-21-ol-3,11,20-trione, and 12α-fluoro-cortisone, for the 12α-fluoro-11-ketoprogesterone in the process of Example 1 the corresponding 3,20-bis-ethylene ketals are produced.

EXAMPLE 2

*11β,12β-oxido-11α-methyl-Δ⁵-pregnene-3,20-dione 3,20-bis-ethylene ketal (II)*

A solution of 12α-fluoro-11-ketoprogesterone 3,20-bis-ethylene ketal (60 mg.) in 2 ml. of benzene is stirred with 3 ml. of an ethereal solution of lithium methyl (11 mg. Li/ml.) for 18 hours. The excess reagent is decomposed by the addition of a little ice and the ether solution is washed several times with water, dried over sodium sulfate and then evaporated in vacuo. The residue (about 64 mg., M.P. about 184–192°) is crystallized from acetone-hexane to give an analytical sample M.P. about 210–213°; $[\alpha]_D -33°$ (c. 0.61 in $CHCl_3$);

$$\lambda^{Nujol}_{max.}$$

no absorption in the hydroxyl or carbonyl regions.

*Analysis.*—Calcd. for $C_{26}H_{38}O_5$ (430.56); C, 72.50; H, 8.90. Found: C, 72.84; H, 8.80.

Similarly, by substituting butyl lithium for the lithium methyl in Example 2, 11β,12β-epoxy-11α-butyl-Δ⁵-pregnene-3,20-dione 3,20-bis-ethylene ketal is formed.

Furthermore, by substituting other steroids, such as the 3,20-bis-ethylene ketals of 12α-chloro-11-ketoprogesterone, 12α-fluoro-17α-hydroxy-11-ketoprogesterone, 12α-fluoro-Δ⁴-pregnene-21-ol-3,11,20-trione and 12α-fluorocortisone for the steroid reactant in Example 2, the corresponding 11β,12β-epoxy-11α-methyl derivatives are formed.

EXAMPLE 3

*11α-methyl-12 ketoprogesterone (III) and 11α-fluoro-11β-methyl-12β-hydroxyprogesterone*

Hydrogen fluoride is bubbled into a stirred solution of 85 mg. of 11β,12β-oxido-11α-methyl-Δ⁵-pregnene-3,20-dione 3,20-bis-ethylene ketal in 10 ml. of chloroform and 0.5 ml. of absolute ethanol at 0°. The reaction mixture slowly becomes blue in color and two phases are formed; at this point passage of hydrogen fluoride is discontinued and the mixture is stirred at 0° for 70 minutes. The reaction mixture is then neutralized by the addition of an aqueous suspension of sodium bicarbonate and the steroids are extracted with chloroform. The chloroform extract is washed with water, dried over sodium sulfate and evaporated to dryness in vacuo. Crystallization from acetone-hexane gives 26 mg. of 11α-methyl-12-ketoprogesterone having M.P. about 217–227°. Two crystallizations from acetone-hexane gives an analytical sample having M.P. about 226–229°; $[\alpha]_D$ +222° (c. 0.98 in $CHCl_3$);

$\lambda_{max.}^{KBr}$ 5.90, 6.03, 6.11μ

*Analysis.*—Calcd. for $C_{22}H_{30}O_3$ (342.46): C, 77.15, H, 8.83. Found: C, 77.35; H, 8.75.

Concentration of the mother liquors from the above crystallization gives a second crop of crystals (21.6 mg., M.P. 170–178°), which after two crystallizations from acetone-hexane yields an analytical sample of 11α-fluoro-11β-methyl-12β-hydroxy-progesterone, having M.P. about 181–182°; $[\alpha]_D$ +41° (c. 1.04 in $CHCl_3$);

$\lambda_{max.}^{alc.}$ 239 mμ (15,700); $\lambda_{max.}^{KBr}$ 3.00, 6.00, 6.17μ

*Analysis.*—Calcd. for $C_{22}H_{31}O_3F$ (362.47); C, 72.89; H, 8.62. Found: C, 72.95; H, 8.67.

Similarly, by substituting other steroids for the 11β,12β-epoxy-11α-methyl-Δ⁵-pregnene-3,20-dione 3,20-bis-ethylene ketal in Example 3, the corresponding steroid derivatives are formed. Thus, 11β,12β-epoxy-11α-butyl-Δ⁵-pregnene-3,20-dione 3,20-bis-ethylene ketal, 11β,12β-epoxy-11α-methyl-Δ⁵-pregnene-17α-ol-3,20-dione 3,20-bis-ethylene ketal, 11β,12β-epoxy-11α-methyl-Δ⁵-pregnene-21-ol-3,20-dione 3,20-bis-ethylene ketal and 11β,12β-epoxy-11α-methyl-Δ⁵-pregnene - 17α,21-diol-3,20-dione 3,20-bis-ethylene ketal yield a mixture of 11α-butyl-12-ketoprogesterone and 11α-fluoro-11β-butyl-12β-hydroxyprogesterone; 11α-methyl-12-keto-17α-hydroxyprogesterone and 11α-fluoro - 11β-methyl-17α,12β - dihydroxyprogesterone; 11α-methyl-Δ⁴-pregnene-21-ol-3,12,20-trione and 11α-fluoro-11β-methyl-Δ⁴-pregnene-12β,2-diol-3,20-dione; and 11α-methyl-Δ⁴-pregnene - 17α,21-diol - 3,12,20-trione and 11α-fluoro - 11β - methyl - Δ⁴ - pregnene-12β,17α,21-triol-3,20-dione.

EXAMPLE 4

*11α-chloro-11β-methyl-12β-hydroxyprogesterone (V)*

To a solution of 50 mg. of 11β,12β-oxido-11α-methyl-Δ⁵-pregnene-3,20-dione 3,20-bis-ethylene ketal in 5 ml. of chloroform is added at 0° 1 ml. of 0.5 N hydrogen chloride in chloroform. The mixture is allowed to remain at 0° for one hour, and then extracted with dilute sodium bicarbonate solution. The chloroform solution is dried over sodium sulfate and the solvent removed in vacuo. The residue is dissolved in 10 ml. of methanol and .34 ml. of 8% sulfuric acid and the solution is refluxed for one hour to complete the hydrolysis of the ketal groups in the 3- and 20-positions. The solution is neutralized with sodium bicarbonate, the methanol removed in vacuo and the residual suspension extracted with chloroform. The sodium sulfate dried chloroform extract is evaporated to dryness in vacuo and the residual material crystallized from 95% alcohol.

Similarly, by substituting hydrogen bromide for the hydrogen chloride in the process of Example 4, 11α-bromo-11β-methyl-12β-hydroxyprogesterone (VI) is obtained.

EXAMPLE 5

*11α-fluoro-11β-methyl-12-ketoprogesterone (VII)*

A solution of 40 mg. of the 11β-hydroxy compound (IV) in 2 ml. of acetone is treated with a solution of chromium trioxide (200 mg./ml.) and sulfuric acid (320 mg./ml.) in water until a permanent yellow coloration is obtained. The mixture is then stirred for 55 minutes. Dilution with water followed by crystallization from acetone-hexane yields the 12-ketone M.P. about 228–232°;

$\lambda_{max.}^{alc.}$ 238 (16,400); $\lambda_{max.}^{KBr}$ 5.82, 5.90, 5.99, 6.12μ

No change in U.V. on standing in 2% potassium hydroxide in methanol for 24 hours.

Similarly, any other of the 11α-halo-11β-(lower alkyl)-12β-hydroxy steroids of this invention can be oxidized to their 12-keto derivatives. Thus, 11α-chloro-11β-methyl-12β-hydroxyprogesterone and 11α-bromo - 11β - methyl-12β-hydroxyprogesterone yield 11α-chloro-11β-methyl-12-ketoprogesterone (VIII) and 11α-bromo-11β-methyl-12-ketoprogesterone (IX), respectively. Furthermore 11α-fluoro-11β-butyl - 12β - hydroxyprogesterone, 11α-fluoro-11β-methyl - 17α,12β - dihydroxyprogesterone, 11α-fluoro-11β-methyl-Δ⁴-pregnene-12β,21-diol-3,20-dione 21-acetate and 11α-fluoro - 11β - methyl - Δ⁴-pregnene-12β,17α,21-triol-3,20-dione 21-acetate (the last two being formed by treating the free 21-hydroxy derivative the acetic anhydride in the presence of pyridine) yield 11α-fluoro-11β-butyl-12-ketoprogesterone, 11α - fluoro - 11β - methyl-17α-hydroxy - 12 - ketoprogesterone, 11α-fluoro-11β-methyl-Δ⁴-pregnene-21-ol-3,12,-20-trione 21 - acetate, 11α-fluoro-11β-methyl - Δ⁴ - pregnene - 17α,21-diol-3,12,20-trione 21-acetate, and 11α-fluoro-11β-methyl - Δ⁴ - androstene-3,12,17-trione, respectively.

The invention may be variously otherwise embodied within the scope of the appended claims.

What is claimed is:

1. A steroid of the general formula

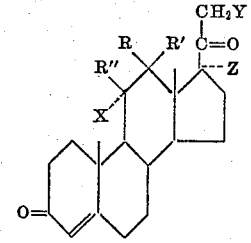

wherein R is hydrogen, R' is β-hydroxy and together R and R' is keto, R'' is lower alkyl, X is halogen, Y is selected from the group consisting of hydrogen, hydroxy and the acyloxy radical of a hydrocarbon carboxylic acid of less than ten carbon atoms, and Z is selected from the group consisting of hydrogen and hydroxy.

2. 11α-halo-11β-methyl-12β-hydroxyprogesterone.
3. 11α-fluoro-11β-methyl-12β-hydroxyprogesterone.
4. 11α-halo-11β-methyl-12-ketoprogesterone.
5. 11α-fluoro-11β-methyl-12-ketoprogesterone.
6. A process for preparing a steroid of the general formula

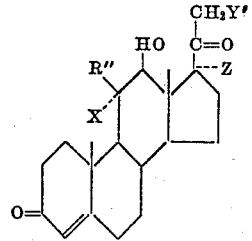

wherein R'' is lower alkyl, X is halogen, Y' is selected from the group consisting of hydrogen and hydroxy, and Z is selected from the group consisting of hydrogen and hydroxy, which comprises interacting a corresponding steroid of the general formula

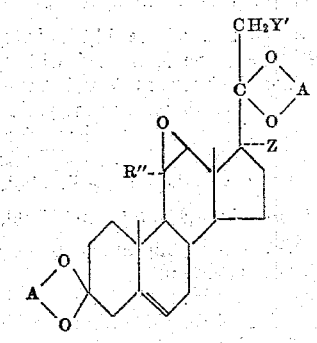

wherein A is lower alkylene and R", Y' and Z are as above defined with a hydrogen halide, removing the ketal groups by acid hydrolysis and recovering the 11α-halo steroid formed.

7. A process for preparing a steroid of the general formula

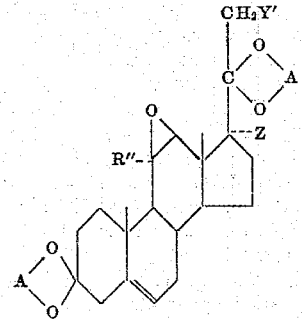

wherein A is lower alkylene, R" is lower alkyl, Y' is selected from the group consisting of hydrogen and hydroxy, and Z is selected from the group consisting of hydrogen and hydroxy, which comprises reacting a corresponding steroid of the general formula

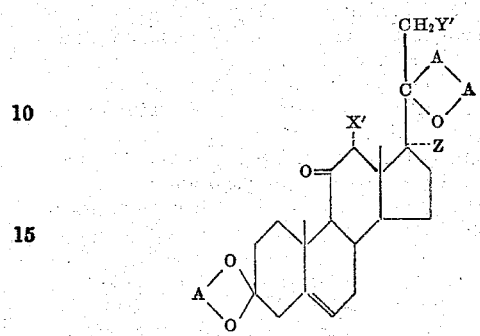

wherein X' is selected from the group consisting of chloro and fluoro, and A, Y' and Z are as above defined, with lithium lower alkyl and recovering the steroid product formed.

References Cited in the file of this patent

UNITED STATES PATENTS

| | | |
|---|---|---|
| 2,622,081 | Bernstein et al. | Dec. 16, 1952 |
| 2,756,179 | Fried et al. | July 24, 1956 |
| 2,782,211 | Wettstein | Feb. 19, 1957 |
| 2,790,814 | Hogg et al. | Apr. 30, 1957 |
| 2,844,513 | Wettstein | July 22, 1958 |

OTHER REFERENCES

Wettstein et al.: Helvetica Chimica Acta, 32, Fasc. 3 (1949), pages 880–888, page 882 relied on.

Rothman: J.A.C.S., 78, 1744–1747, Apr. 20, 1956.